(12) United States Patent
Heo et al.

(10) Patent No.: US 11,140,415 B2
(45) Date of Patent: Oct. 5, 2021

(54) METHOD AND DEVICE FOR PROCESSING VIDEO SIGNAL

(71) Applicant: LG ELECTRONICS INC., Seoul (KR)

(72) Inventors: Jin Heo, Seoul (KR); Seunghwan Kim, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/763,091

(22) PCT Filed: Nov. 30, 2018

(86) PCT No.: PCT/KR2018/015033
§ 371 (c)(1),
(2) Date: May 11, 2020

(87) PCT Pub. No.: WO2019/107999
PCT Pub. Date: Jun. 6, 2019

(65) Prior Publication Data
US 2020/0396483 A1    Dec. 17, 2020

Related U.S. Application Data

(60) Provisional application No. 62/593,195, filed on Nov. 30, 2017.

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/11* (2014.11);
(Continued)

(58) Field of Classification Search
None
See application file for complete search history.

(56) References Cited

U.S. PATENT DOCUMENTS 9,451,254 B2 * 9/2016 Joshi ...................... H04N 19/70
10,171,819 B2 * 1/2019 Ramamurthy ....... H04N 19/154
(Continued)

FOREIGN PATENT DOCUMENTS

KR         101353301 B1   1/2014
KR    1020140074347 A    6/2014
(Continued)

*Primary Examiner* — Chikaodili E Anyikire
(74) *Attorney, Agent, or Firm* — Dentons US LLP

(57) ABSTRACT

The present invention relates to a method for decoding a bitstream for a video signal and a device therefor, the method comprising the steps of: acquiring a value indicating the similarity between reference samples for intra prediction of a current block; determining an intra prediction mode of the current block on the basis of the acquired value and a predetermined threshold value; and reconstructing the current block on the basis of the determined intra prediction mode, wherein the step of determining the intra prediction mode of the current block comprises: when the value indicating the similarity is smaller than the predetermined threshold value, acquiring index information from the bitstream; preparing a list of candidate modes on the basis of intra prediction modes of blocks neighboring the current block, without acquiring flag information indicating whether the intra prediction mode of the current block is derived from the blocks neighboring the current block; and determining, as the intra prediction mode of the current block, a candidate mode that is indicated by the index information among the candidate modes in the prepared list.

10 Claims, 12 Drawing Sheets

(51) Int. Cl.
*H04N 19/11* (2014.01)
*H04N 19/124* (2014.01)
*H04N 19/132* (2014.01)
*H04N 19/159* (2014.01)
*H04N 19/176* (2014.01)
*H04N 19/70* (2014.01)

(52) U.S. Cl.
CPC ......... *H04N 19/124* (2014.11); *H04N 19/132* (2014.11); *H04N 19/159* (2014.11); *H04N 19/176* (2014.11); *H04N 19/70* (2014.11)

(56) References Cited

U.S. PATENT DOCUMENTS

| | | | | |
|---|---|---|---|---|
| 2013/0182971 | A1* | 7/2013 | Leontaris | H04N 19/147 |
| | | | | 382/275 |
| 2014/0211845 | A1* | 7/2014 | Lei | H04N 19/117 |
| | | | | 375/240.02 |
| 2015/0023405 | A1* | 1/2015 | Joshi | H04N 19/593 |
| | | | | 375/240.02 |
| 2015/0103883 | A1* | 4/2015 | Wu | H04N 19/119 |
| | | | | 375/240.02 |
| 2019/0141319 | A1* | 5/2019 | Moon | H04N 19/11 |
| 2019/0158829 | A1* | 5/2019 | Ohkawa | H04N 19/136 |

FOREIGN PATENT DOCUMENTS

| | | |
|---|---|---|
| KR | 1020170065686 A | 6/2017 |
| KR | 101769573 B1 | 8/2017 |
| KR | 1020170124499 A | 11/2017 |

* cited by examiner (a)

(b)

(a) Reference samples of the same size as the current block (b) Reference samples of a greater size than the current block

METHOD AND DEVICE FOR PROCESSING VIDEO SIGNAL

This application is the National Phase of PCT International Application No. PCT/KR2018/015033, filed on 30 Nov. 2018, which claims priority under 35 U.S.C. 119(e) to U.S. Provisional Application No. 62/593,195, filed on 30 Nov. 2017 which is hereby incorporated by reference herein in their entirety.

TECHNICAL FIELD

The present invention relates to a video processing method, and more specifically, relates to a method and apparatus for processing a video signal using an intra prediction.

BACKGROUND ART

In accordance with the rapid development of a digital video processing technology, a digital multimedia service using various media such as high-definition digital broadcasting, digital multimedia broadcasting, internet broadcasting and the like has been activated. As the high-definition digital broadcasting becomes common, various service applications have been developed and high-speed video processing techniques for video images of high quality and high definition are required. To this end, standards for coding video signals such as H.265/HEVC (High Efficiency Video Coding) and H.264/AVC (Advanced Video Coding) have been actively discussed.

DISCLOSURE

Technical Task

One technical task of the present disclosure is to provide a method and apparatus for processing a video signal efficiently.

Another technical task of the present disclosure is to improve coding efficiency and prediction performance in a manner of determining an intra prediction mode based on similarity of reference samples for an intra prediction of the currently processed block.

Technical tasks obtainable from the present disclosure are non-limited by the above-mentioned technical task. And, other unmentioned technical tasks can be clearly understood from the following description by those having ordinary skill in the technical field to which the present disclosure pertains.

Technical Solutions

In a first aspect of the present disclosure, provided herein is a method of decoding a bitstream for a video signal by a decoding apparatus, the method comprising: obtaining a value representing similarity between reference samples for an intra prediction of a current block; determining an intra prediction mode of the current block based on the obtained value and a specific threshold value; and reconstructing the current block based on the determined intra prediction mode, wherein determining the intra prediction mode of the current block comprises: obtaining index information from the bitstream when the value representing the similarity is smaller than the specific threshold value, wherein obtaining flag information indicating whether the intra prediction mode of the current block is derived from a neighboring block of the current block is skipped; constructing a candidate mode list based on an intra prediction mode of the neighboring block of the current block; and determining a candidate mode indicated by the index information among the constructed candidate mode list as the intra prediction mode of the current block.

In a second aspect of the present disclosure, provided herein is an apparatus for decoding a bitstream for a video signal, the apparatus comprising: a memory; and a processor operatively connected to the memory, wherein the processor is configured to: obtain a value representing similarity between reference samples for an intra prediction of a current block; determine an intra prediction mode of the current block based on the obtained value and a specific threshold value; and reconstruct the current block based on the determined intra prediction mode, wherein determining the intra prediction mode of the current block comprises: obtaining index information from the bitstream when the value representing the similarity is smaller than the specific threshold value, wherein obtaining flag information indicating whether the intra prediction mode of the current block is derived from a neighboring block of the current block is skipped; constructing a candidate mode list based on an intra prediction mode of the neighboring block of the current block; and determining a candidate mode indicated by the index information among the constructed candidate mode list as the intra prediction mode of the current block.

Preferably, the value representing the similarity may be obtained based on a difference between a greatest value and a smallest value among the reference samples for the intra prediction of the current block.

Preferably, the value representing the similarity may be obtained based on a variance of the reference samples for the intra prediction of the current block.

Preferably, the specific threshold value may be determined based on a quantization parameter of the current block.

Preferably, the reference samples for the intra prediction of the current block may comprise a reference sample of an upper neighboring block adjacent to the current block, a reference sample of an upper-right neighboring block adjacent to the current block, a reference sample of an upper-left neighboring block adjacent to the current block, a reference sample of a left neighboring block adjacent to the current block, and a reference sample of a lower-left neighboring block adjacent to the current block.

Preferably, determining the intra prediction mode of the current block may further comprise: obtaining the flag information from the bitstream when the value representing the similarity is greater than the specific threshold value; and obtaining the index information from the bitstream when the flag information indicates that the intra prediction mode of the current block is derived from the neighboring block of the current block.

Preferably, determining the intra prediction mode of the current block may further comprise: obtaining intra prediction mode information for the current block from the bitstream when the flag information indicates that the intra prediction mode of the current block is not derived from the neighboring block of the current block.

Advantageous Effects

According to the present disclosure, a video signal can be efficiently processed.

According to the present disclosure, coding efficiency and prediction performance can be improved in a manner of determining an intra prediction mode based on similarity of reference samples for an intra prediction of the currently processed block.

Effects obtainable from the present disclosure are non-limited by the above-mentioned effects. And, other unmentioned effects can be clearly understood from the following description by those having ordinary skill in the technical field to which the present disclosure pertains.

DESCRIPTION OF DRAWINGS

The accompanying drawings, which are included to provide a further understanding of the invention, illustrate embodiments of the invention and together with the description serve to explain the principle of the invention.

BEST MODE FOR DISCLOSURE

Figure 1:
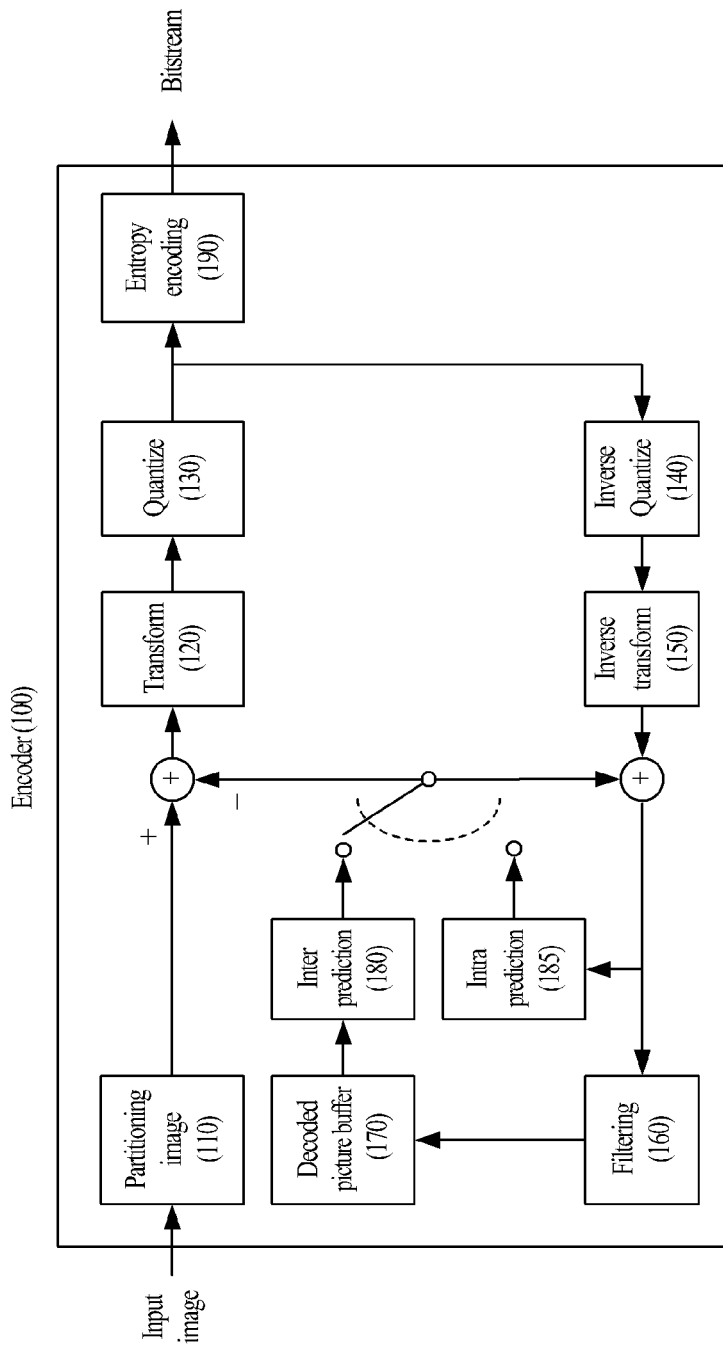
FIG. 1 illustrates an encoder for encoding a video signal.

A technology described in the following can be used for an image signal processing apparatus configured to encode and/or decode a video signal. Generally, a video signal corresponds to an image signal or a sequence of pictures capable of being recognized by eyes. Yet, in the present specification, the video signal can be used to refer to a sequence of bits representing a coded picture or a bit stream corresponding to a bit sequence. A picture may indicate an array of samples and can be referred to as a frame, an image, or the like. More specifically, the picture may indicate a two-dimensional array of samples or a two-dimensional sample array. A sample may indicate a minimum unit for constructing a picture and may be referred to as a pixel, a picture element, a pel, or the like. The sample may include a luminance (luma) component and/or a chrominance (chroma, color difference) component. In the present specification, coding may be used to indicate encoding or may commonly indicate encoding/decoding.

A picture may include at least one or more slices and a slice may include at least one or more blocks. The slice can be configured to include the integer number of blocks for purposes such as parallel processing, resynchronization of decoding when a bit stream is damaged due to data loss, and the like. Each slice can be independently coded. A block may include at least one or more samples and may indicate an array of samples. A block may have a size equal to or a less than a size of a picture. A block may be referred to as a unit. A currently coded (encoded or decoded) picture may be referred to as a current picture and a block currently being coded (encoded or decoded) may be referred to as a current block. There may exist various block units constructing a picture. For example, in case of ITU-T (International Telecommunication Union Telecommunication Standardization Sector) H.265 standard (or High Efficiency Video Coding (HEVC) standard), there may exist such a block unit as a coding tree block (CTB) (or a coding tree unit (CTU)), a coding block (CB) (or a coding unit (CU)), a prediction block (PB) (or a prediction unit (PU)), a transform block (TB) (or a transform unit (TU)), and the like.

The coding tree block corresponds to the most basic unit for constructing a picture and can be divided into coding blocks of a quad-tree form to improve coding efficiency according to texture of a picture. The coding block may correspond to a basic unit for performing coding and intra-coding or inter-coding can be performed in a unit of the coding block. The intra-coding is to perform coding using intra prediction and the intra prediction is to perform prediction using samples included in the same picture or slice. The inter-coding is to perform coding using inter prediction and the inter prediction is to perform prediction using samples included in a picture different from a current picture. A block coded using the intra-coding or coded in an intra prediction mode may be referred to as an intra block, and a block coded using the inter-coding or coded in an inter prediction mode may be referred to as an inter block. And, a coding mode using intra prediction can be referred to as an intra mode, and a coding mode using inter prediction can be referred to as an inter mode.

The prediction block may correspond to a basic unit for performing prediction. Identical prediction can be applied to a prediction block. For example, in case of the inter prediction, the same motion vector can be applied to one prediction block. The transform block may correspond to a basic unit for performing transformation. The transformation may correspond to an operation of transforming samples of a pixel domain (or a spatial domain or a time domain) into a conversion coefficient of a frequency domain (or a transform coefficient domain), or vice versa. In particular, an operation of converting a conversion coefficient of the frequency domain (or transform coefficient domain) into samples of the pixel domain (or spatial domain or time domain) can be referred to as inverse transformation. For example, the transformation may include discrete cosine transform (DCT), discrete sine transform (DST), a Fourier transform, and the like. A prediction block and/or a transform block may be configured to have the same size as a coding block, and in this case the prediction may be performed and/or the transformation may be performed in the unit of a coding block.

In the present specification, a coding tree block (CTB) may be interchangeably used with a coding tree unit (CTU), a coding block (CB) may be interchangeably used with a coding unit (CU), a prediction block (PB) may be interchangeably used with a prediction unit (PU), and a transform block (TB) may be interchangeably used with a transform unit (TU).

FIG. 1 is a block diagram of an encoder performing encoding of a video signal as an embodiment to which the present disclosure is applied.

Referring to FIG. 1, an encoder 100 may include an image split part 110, a transforming part 120, a quantizing part 130, a dequantizing part 140, an inverse-transforming part 150, a filtering part 160, a Decoded Picture Buffer (DPB) 190, an inter prediction part 180, an intra prediction part 185, and an entropy encoding part 190.

The image split part 110 may split an input image (or, picture, frame, etc.) inputted to the encoder 100 into one or more processed units. For example, the processed unit may include a Coding Tree Unit (CTU), a Coding Unit (CU), a Prediction Unit (PU), or a Transform Unit (TU).

The encoder 100 may generate a residual signal by subtracting a prediction signal outputted from the inter prediction part 180 or the intra prediction part 185 from an input image signal, and the generated residual signal is transmitted to the transforming part 120.

The transforming part 120 may generate a transform coefficient by performing transform based on the residual signal. For example, a transform scheme may include at least one of Discrete Cosine Transform (DCT), Discrete Sine Transform (DST), Karhunen-Loeve Transform (KLT), Graph-Based Transform (GBT), and Conditionally Non-linear Transform (CNT). Particularly, 4×4 or 32×32 integer-based DCT is available, and 4×4, 8×8, 16×16, and 32×32 transforms are available. When inter-pixel relation information is represented as a graph, GBT means a transform obtained from this graph. CNT means a transform obtained based on a prediction signal generated using all previously reconstructed pixels. In addition, a transform process is applicable to a pixel block having the same size of a square or a block having a non-square variable size.

The quantizing part 130 may quantize the transform coefficient and then send it to the entropy encoding part 190. And, the entropy 190 encoding part may entropy-code and output the quantized signal as a bitstream. For example, the entropy coding may be performed based on Fixed Length Coding (FLC), Variable Length Coding (VLC), or arithmetic coding. Particularly, context adaptive binary arithmetic coding (CABAC) based on arithmetic coding, Exp-Golomb coding based on variable length coding, and fixed length coding are applicable.

The quantized signal outputted from the quantizing part 130 is usable to generate a prediction signal. For example, the quantized signal may reconstruct a residual signal by applying dequantization and inverse transform through the dequantizing part 140 and the inverse-transforming part 150. A reconstructed signal may be generated by adding the reconstructed residual signal to the prediction signal outputted from the inter prediction part 180 or the intra prediction part 185.

The filtering part 160 applies filtering to the reconstructed signal and then outputs it to a playback device or the decoded picture buffer 170. For the filtering, a deblocking filter or a Sample Adaptive Offset (SAO) filter is applicable for example. The filtered signal transmitted to the decoded picture buffer 179 may be used as a reference picture in the inter prediction part 180. Thus, using a filtered picture as a reference picture in inter prediction mode, coding efficiency can be improved as well as an image quality.

The decoded picture buffer 170 may store the filtered picture to use a reference picture in the inter prediction part 180.

The inter prediction part 180 performs temporal prediction and/or spatial prediction to remove temporal redundancy and/or spatial redundancy with reference to a reconstructed picture. In doing so, to reduce a quantity of motion information transmitted in inter prediction mode, it is able to predict motion information based on correlation of the motion information between a neighboring block and the current block.

The intra prediction part 185 may predict the current block by referring to samples around the current block. The intra prediction part 185 may perform the following procedure to perform intra prediction. First, a reference sample needed to generate a prediction signal may be prepared. And, a prediction signal may be generated using the prepared reference sample. Then, the prediction mode is encoded. At this time, the reference sample may be prepared through reference sample padding and/or reference sample filtering. A quantization error may exist because the reference sample has undergone a prediction and reconstruction process. Therefore, to reduce such an error, a reference sample filtering process may be performed for each prediction mode used for an intra prediction.

The prediction signal generated by the inter prediction part 180 or the intra prediction part 185 may be used to generate a reconstructed signal or a residual signal.

Figure 2:
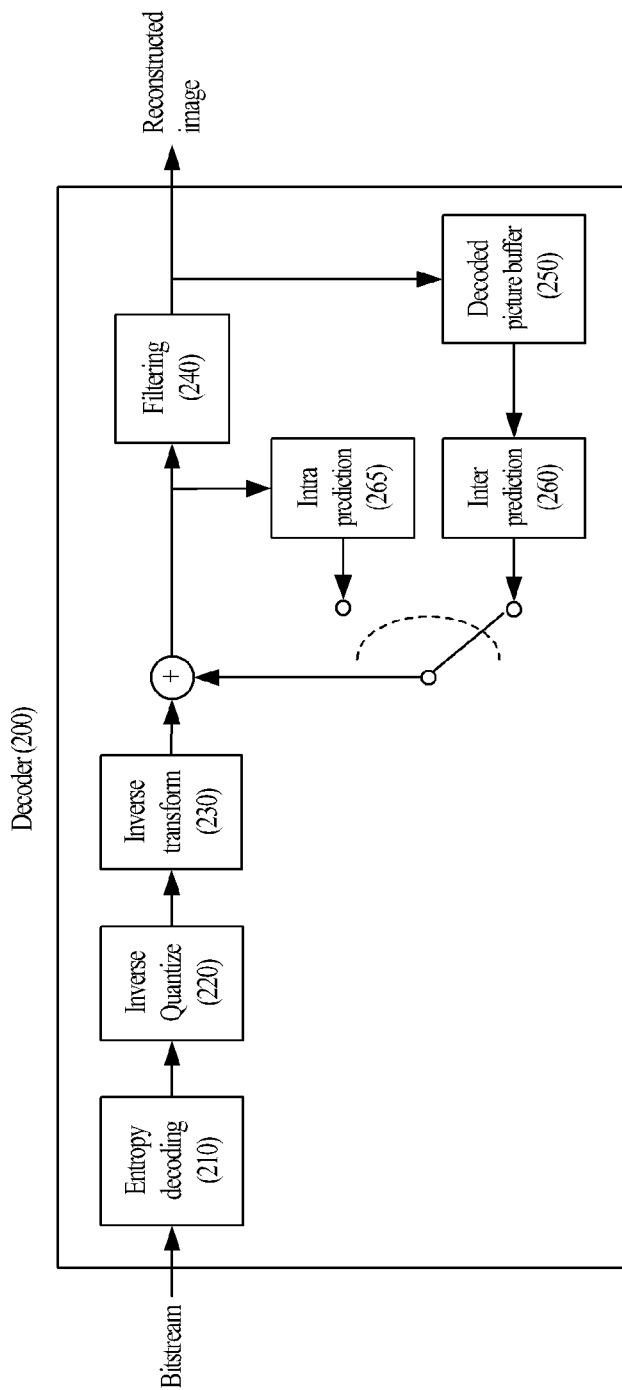
FIG. 2 illustrates a decoder for decoding a video signal.

FIG. 2 is a block diagram of a decoder performing decoding of a video signal as an embodiment to which the present disclosure is applied.

Referring to FIG. 2, a decoder 200 may include an entropy decoding part 210, a dequantizing part 220, an inverse-transforming part 230, a filtering part 240, a Decoded Picture Buffer (DPB) unit 250, an inter prediction part 260 and an intra prediction part 265.

And, a reconstructed image signal outputted through the decoder 200 may be reproduced through a playback device.

The decoder 200 may receive a signal outputted from the encoder 100 of FIG. 1, and the received signal may be entropy-decoded through the entropy decoding part 210.

The dequantizing part 220 obtains a transform coefficient from the entropy-decoded signal using quantization step size information.

The inverse-transforming part 230 obtains a residual signal by performing inverse transform based on the dequantized transform coefficient.

The obtained residual signal is added to a prediction signal outputted from the inter prediction part 260 or the intra prediction part 265, thereby generating a reconstructed signal.

The filtering part 240 applies filtering to the reconstructed signal and then outputs it to the playback device or transmits it to the decoded picture buffer 250. The filtered signal transmitted to the decoded picture buffer 250 may be used as a reference picture by the inter prediction part 260.

In the present specification, the embodiments described in the filtering part 160, the inter prediction part 180 and the intra prediction part 185 of the encoder 100 are exactly applicable to the filtering part 240, the inter prediction part 260 and the intra prediction part 265 of the decoder, respectively.

Figure 3:
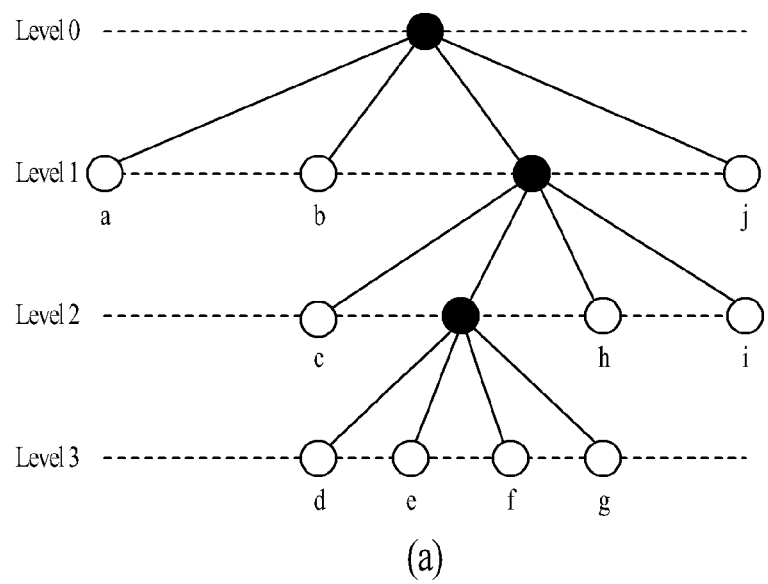
FIG. 3 illustrates a partitioning structure of a coding unit.
Figure 3:
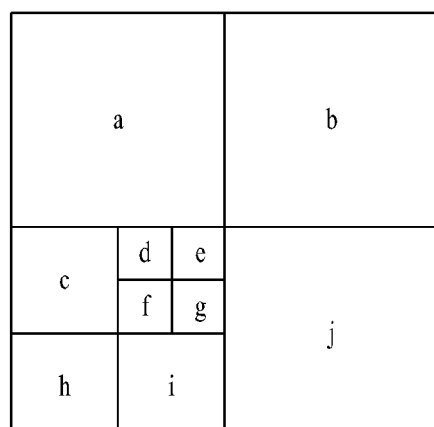

FIG. 3 is a diagram to describe a split structure of a coding unit.

An encoder and decoder may split a single image (or picture) in unit of a Coding Tree Unit (CTU) in a quadrilateral shape and perform encoding and decoding in unit of the CTU.

A single CTU may be split based on a quadtree (hereinafter 'QT') structure. For example, a single CTU can be split into four units with a square shape and a half-decreased length of each side. Such split of the QT structure may be performed recursively.

Referring to FIG. 3, a root node of QT may be related to CTU. The QT may be split until a leaf node is reached, and the leaf node may be referred to as a Coding Unit (CU). The CTU corresponds to the root node and has the smallest depth (i.e. level 0) value. Depending on the characteristics of an input image, the CTU may not be split. In this case, the CTU corresponds to the CU.

In the example of FIG. 3, a CTU may be split in form of QT. As a result, lower nodes having a depth of level 1 may be generated. And, a node that is no longer split (i.e., a leaf node) among the lower nodes having the depth of level 1 corresponds to a CU. For example, in FIG. 3 (b), CU a, CU b and CU j respectively corresponding to a node a, node b and node j are split once in CTU and have the depth of level 1.

Regarding a single CU, information indicating whether the corresponding CU is split may be delivered to a decoder. For example, the information may be defined as a split flag and represented as syntax information 'split_cu_flag'. The split flag may be included in every CU except CU in small size. For example, if a value of the split flag is '1', the corresponding CU is split into 4 CUs again. If a value of the split flag is '0', the corresponding CU is no longer split and a coding process for the corresponding CU may be performed.

Although a split process of CU is described for example in FIG. 3, the above-mentioned QT structure is applicable to a split process of a Transform Unit (TU) that is a basic unit for performing transform.

TU may be hierarchically split into a QT structure from CU to be coded. For example, CU may correspond to a root node of a tree for Transform Unit (TU).

As TU is split according to a QT structure, TU split from CU may be split into a smaller lower TU again. For example, a size of TU may be determined as one of 32×32, 16×16, 8×8, and 4×4, by which the present disclosure is non-limited. In case of a high-resolution image, a size of TU may be further increased or diversified.

Regarding a single TU, information indicating whether the corresponding TU is split may be delivered to a decoder. For example, the information may be defined as a split transform flag and represented as syntax information 'split_transform_flag'.

Figure 4:
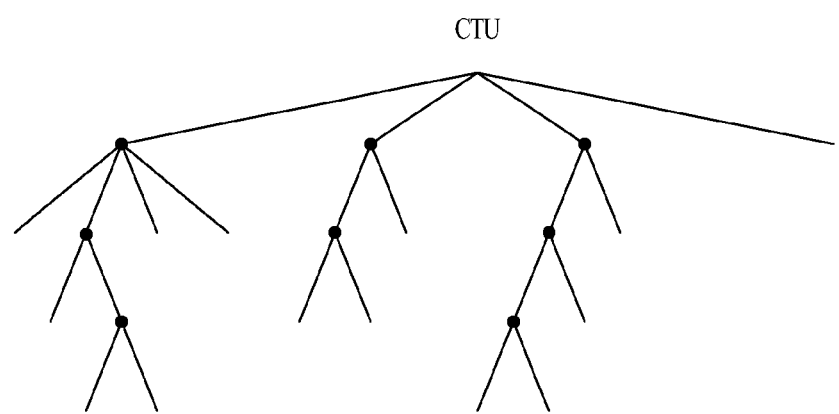
FIG. 4 illustrates a quadtree-binary tree in a partitioning structure of a coding unit.
Figure 4:
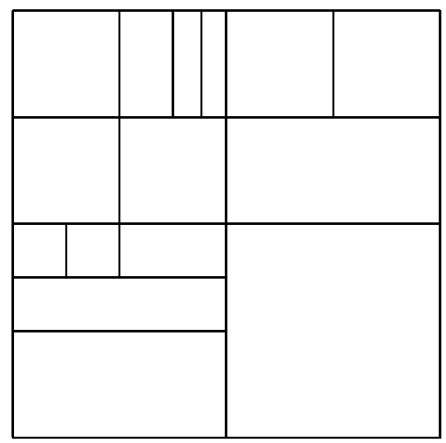

FIG. 4 is a diagram to describe a quadtree-binary tree in a split structure of a coding unit.

An encoder and decoder may split a single image (or picture) in unit of a Coding Tree Unit (CTU) in a quadrilateral shape and perform encoding and decoding in unit of the CTU.

In the example of FIG. 4, compared to the example of FIG. 3, a single CTU may be split based on a quadtree and Binary Tree (BT) structure. For example, a single CTU may be split into four units with a square shape and a half-decreased length of each side or two units with a rectangular shape and a half-decreased width or height. Such split of the QT BT structure may be performed recursively.

Referring to FIG. 4, a root node of QT may be related to CTU. The QT may be split until a QT leaf node is reached. And, the leaf node of the QT may be split until a BT leaf node is reached.

In the example of FIG. 4, CTU corresponds to a root node and have a value of a smallest depth (i.e., level 0). Depending on the characteristics of an input image, the CTU may not be split. In this case, the CTU corresponds to CU.

CTU may be split in form of QT and QT leaf node may be split in form of BT. As a result, lower nodes having a depth of level n may be generated. And, a node that is not further split (i.e., a leaf node) among the lower nodes having the depth of level n corresponds to CU.

Regarding a single CU, information indicating whether the corresponding CU is split may be delivered to a decoder. For example, the information may be defined as a split flag and represented as syntax information 'split_cu_flag'. Moreover, information indicating whether to be split into BT from QT leaf may be delivered to the decoder. For example, the information may be defined as BT split flag and represented as syntax information 'bt_split_flag'. Additionally, in case of being split into BT by bt_split_flag, a BT split shape may be delivered to the decoder so as to be split into a rectangle with a half width or a rectangular shape with a half height. For example, the information may be defined as BT split mode and represented as 'bt_split_mode'.

Figure 5:
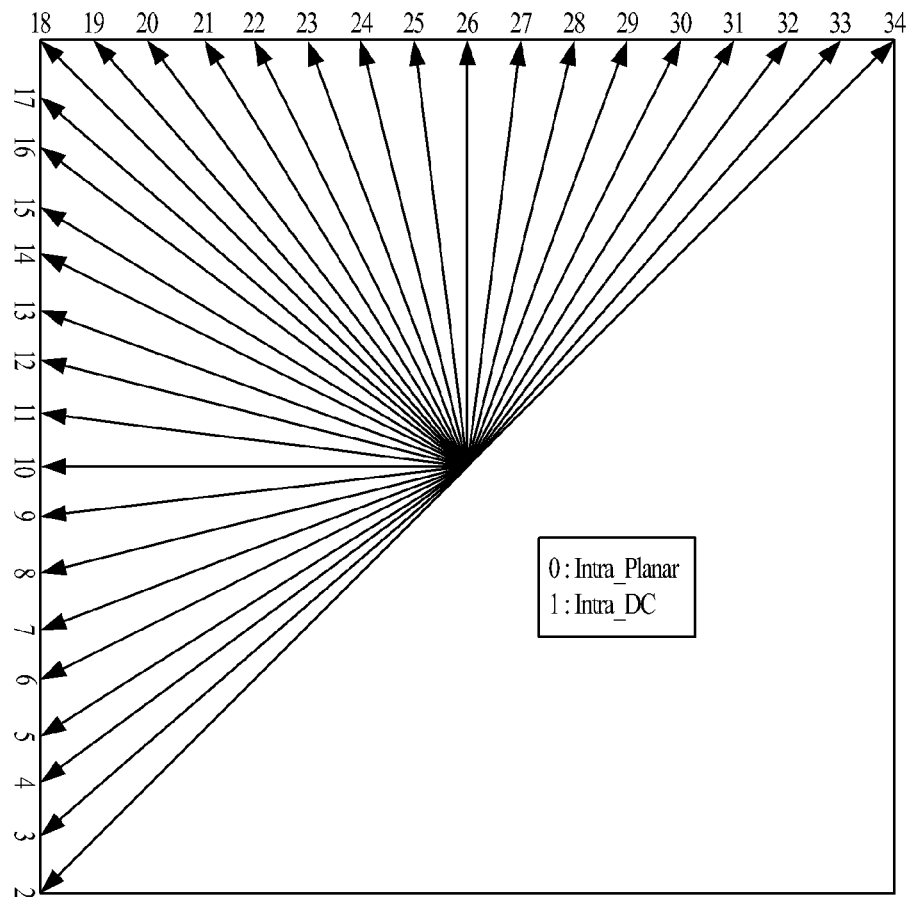
FIG. 5 illustrates an example of an intra prediction mode.

FIG. 5 shows an example of an intra prediction mode.

An intra prediction mode indicates various prediction modes according to values. For example, a value of an intra prediction mode may correspond to an intra prediction mode exemplarily shown in Table 1.

TABLE 1

| Intra prediction mode | Associated name |
|---|---|
| 0 | INTRA_PLANAR |
| 1 | INTRA_DC |
| 2 . . . 34 | INTRA_ANGULAR2 . . . INTRA_ANGULAR34 |

In Table 1, INTRA_PLANAR represents an intra planar prediction mode and indicates a mode of obtaining a predictor of the current block by performing interpolation on a reconstructed sample of an upper neighboring block adjacent to the current block, a reconstructed sample of a left neighboring block, a reconstructed sample of a lower-left neighboring block, and a reconstructed sample of a right-upper neighboring block. INTRA_DC represents an intra Direct Current (DC) prediction mode and indicates a mode of obtaining a predictor of the current block using an average of reconstructed samples of a left neighboring block and reconstructed samples of an upper neighboring block. INTRA_ANGULAR2 to INTRA_ANGULAR34 represent an intra angular prediction mode and indicate a mode of finding a predictor of the current sample using a reconstructed sample of a neighboring block located in a direction of a specific angle to the current sample in the current block (e.g., see FIG. 5). If a real sample fails to exist in a direction of a specific angle, a predicted sample may be found by creating a virtual sample for the corresponding direction in a manner of performing interpolation or padding on neighboring reconstructed samples.

Although an intra prediction mode may be derived per coding block, intra prediction may be performed in unit of a coding or transform block. For the intra prediction, a reconstructed sample existing in a neighboring block of the current block may be referred to in the current picture. And, a sample referred to for the intra prediction is referred to as a reference sample. In the intra prediction, prediction of the current block is performed based on a derived prediction mode. A reference sample used for prediction and a specific prediction method may vary depending on a prediction mode.

An encoder and decoder may check whether neighboring samples of the current block are available for prediction and then determine reference samples to use for the prediction. For example, when a size of the current block is nS×nS, neighboring samples of the current block in intra prediction may use nS reference samples adjacent to a left (or a left boundary) of the current block, nS reference samples neighboring a bottom-left of the current block, nS reference samples adjacent to a top (or a top boundary) of the current block, nS reference samples neighboring to a top-right of the current block, and a single sample neighboring a top-left of the current block as reference samples. If some of neighboring samples of the currently processed block are unavailable, the encoder and decoder may determine reference samples with available samples to use for prediction by performing interpolation or padding based on the unavailable samples. Filtering of a reference sample may be performed based on an intra prediction mode.

An encoder and decoder may generate a predictor for the current block based on an intra prediction mode and reference samples. Particularly, the encoder may determine an intra prediction mode using reference samples or a filtered reference sample based on Rate-Distortion (RD) optimization, encode syntax information indicating an intra prediction mode into a bitstream, generate a predictor for the current block based on the determined intra prediction mode, and encode the current block using the generated predictor. The decoder may generate a predictor for the current block based on the intra prediction mode and the reference samples and then reconstruct the current block based on the generated predictor. Namely, the decoder may generate the predictor for the current block based on the intra prediction mode derived from an intra prediction mode inducing step and the reference samples obtained through a reference sample determining step and a reference sample filtering step.

Figure 6:
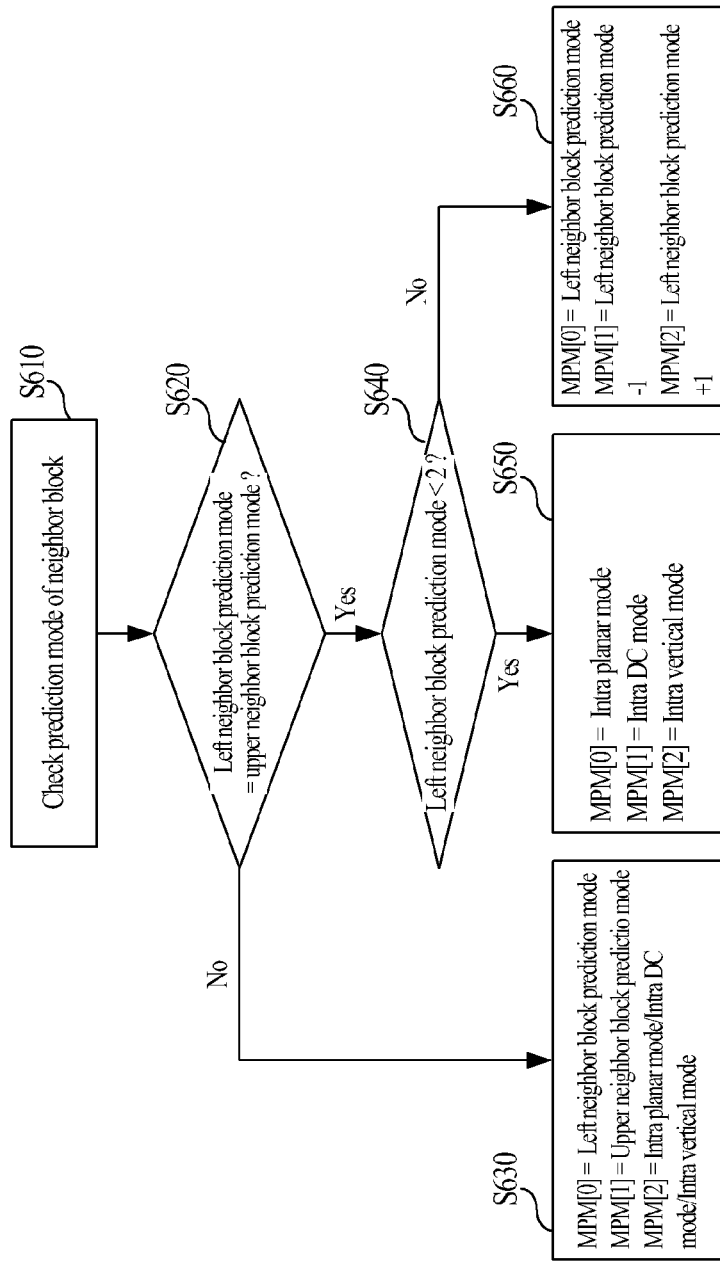
FIG. 6 and FIG. 7 illustrate a signaling method of an intra prediction mode.
Figure 7:
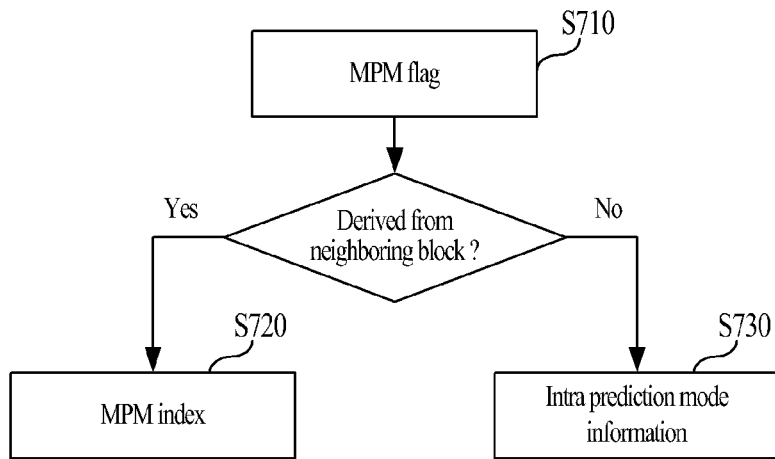

FIG. 6 and FIG. 7 exemplarily show a signaling method of an intra prediction mode.

Generally, if an image is split into blocks, the current block to be coded and a neighboring block may have similar image characteristics. In case of an intra prediction mode, it is highly probable that the current block and a neighboring block have the same or similar intra prediction mode. Hence, an encoder or decoder may use a prediction mode of a neighboring block to encode or derive a prediction mode of the current block.

First of all, in case that a neighboring block is intra-coded, an encoder may check or derive a prediction mode of the neighboring block [S610]. For example, a prediction mode of the current block may be determined based on a prediction mode of a left neighboring block and a prediction mode of an upper neighboring block. In this case, a prediction mode of a corresponding neighboring block may be determined as Most Probable Mode (MPM). The MPM may mean a mode used to improve coding efficiency in consideration of similarity between the current block and a neighboring block upon intra prediction mode coding. Determining MPM may be expressed as listing up MPM candidates (or MPM list}.

The encoder may check whether the prediction mode of the left neighboring block and the prediction mode of the upper neighboring block are identical to each other [S620].

If the prediction mode of the left neighboring block and the prediction mode of the upper neighboring block are not identical to each other, a first MPM may be set to the prediction mode of the left neighboring block, a second MPM may be set to the prediction mode of the upper neighboring block, and a third MPM may be set to one of an intra planar mode, an intra DC mode and an intra vertical mode [S630].

If the prediction mode of the left neighboring block and the prediction mode of the upper neighboring block are identical to each other, the encoder may check whether the prediction mode of the left neighboring block is smaller than 2 [S640].

If the prediction mode of the left neighboring block is smaller than 2, the first MPM may be set to the intra planar mode, the second MPM may be set to the intra DC mode, and the third MPM may be set to the intra vertical mode [S650].

If the prediction mode of the left neighboring block is not smaller than 2, the first MPM may be set to the prediction mode of the left neighboring block, the second MPM may be set to (the prediction mode of the left neighboring block−1), and the third MPM may be set to (the prediction mode of the left neighboring block+1) [S660].

The encoder may determine whether an optimal intra prediction mode to be applied to the current block belongs to the formerly determined MPM candidates. If the intra prediction mode of the current block belongs to the MPM candidates, the encoder may encode an MPM flag and an MPM index into a bitstream.

Referring to FIG. 7, in a step S710, an encoder/decoder may encode/decode MPM flag information. The MPM flag information may indicate whether an intra prediction mode of the current block is derived from a neighboring intra-predicted block of the current block (i.e., the intra prediction mode of the current bock belongs within MPM). For example, the MPM flag information may be referred to as prev_intra_luma_pred_flag for example, if the MPM flag information has a value of 1, it may indicate that the intra prediction mode of the current block is derived from a neighboring block (coded by intra prediction) of the current block. If the MPM flag information has a value of 0, it may indicate that the intra prediction mode of the current block is not derived from a neighboring block (coded by intra prediction) of the current block. Or, the value of the MPM flag information may be set in the other way. Or, the value of the MPM flag information may be set to a value other than 0 or 1.

If the MPM flag information indicates that the intra prediction mode of the current block is derived from the neighboring block, the encoder/decoder may encode/decode MPM index information. The MPM index information may indicate what kind of MPM mode is applied as the intra prediction mode of the current block among MPM candidates included in an MPM candidate list. For example, when the MPM candidate list is constructed like the step S630, the MPM index information may have a value of one of 0 to 2. If the MPM index information has a value of 0, an intra prediction mode of a left neighboring block in the MPM candidate list may be determined/applied as the intra prediction mode of the current block. For another example, when the MPM candidate list is constructed like the step S650, the MPM index information may have a value of one of 0 to 2. If the MPM index information has a value of 1, an intra DC mode in the MPM candidate list may be determined/applied as the intra prediction mode of the current block. The MPM index information may be referred to as mpm_idx for example.

On the contrary, if the intra prediction mode of the current block does not belong to the MPM candidates (or the MPM flag information indicates that the intra prediction mode of the current block is not derived from the neighboring block), the encoder/decoder may encode/decode intra prediction mode information of the current block into/from a bitstream. The intra prediction mode information of the current block may be referred to as rem_intra_luma_pred_mode.

The encoder may signal the intra prediction mode of the current block based on the MPM flag information (e.g., prev_intra_luma_pred_flag), the MPM index information (e.g., mpm_idx), and the intra prediction mode information (e.g., rem_intra_luma_pred_mode) of the current block. And, the decoder may obtain the intra prediction mode of the current block based on the MPM flag information (e.g., prev_intra_luma_pred_flag), the MPM index information (e.g., mpm_idx), and the intra prediction mode information (e.g., rem_intra_luma_pred_mode) of the current block.

Figure 8:
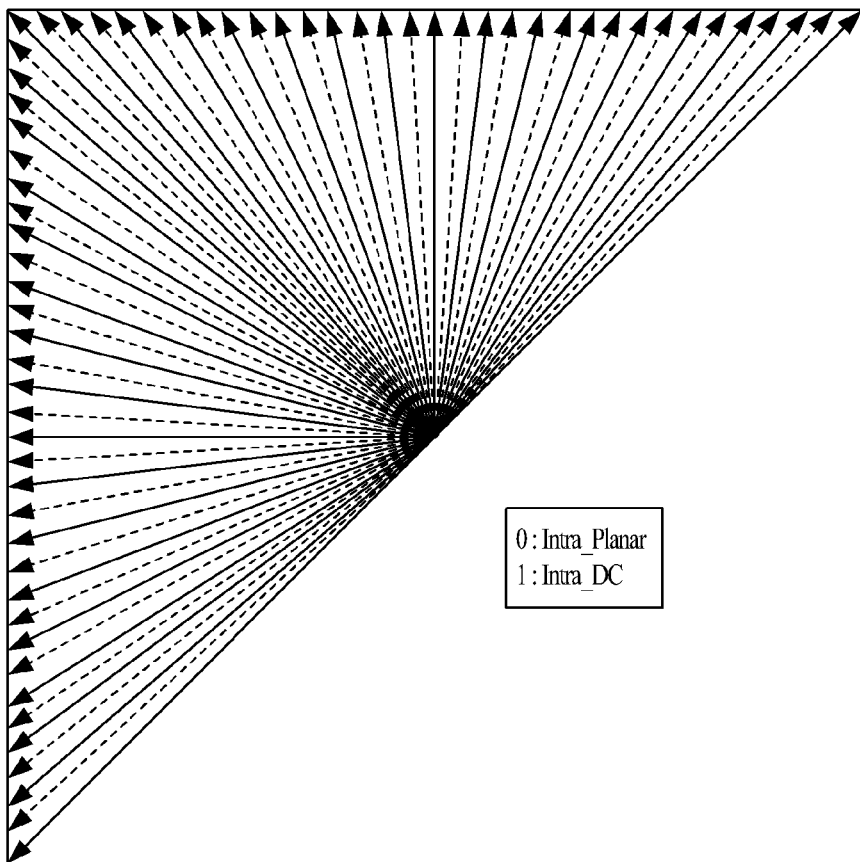
FIG. 8 illustrates an extended intra prediction mode.

FIG. 8 exemplarily shows an extended intra prediction mode.

For the intra coding and further accurate prediction of a high-resolution image, 35 types of intra prediction modes may be extended to 67 types of intra prediction modes. In FIG. 8, arrows denoted by dotted lines indicate 32 types of newly added intra angular prediction modes. For example, a value of an extended intra prediction mode may correspond to an intra prediction mode shown in Table 2 for example.

TABLE 2

| Intra prediction mode | Associated name |
|---|---|
| 0 | INTRA_PLANAR |
| 1 | INTRA_DC |
| 2 ... 66 | INTRA_ANGULAR2 ... INTRA_ANGULAR66 |

An intra prediction mode (INTRA_PLANAR) and an intra DC prediction mode (INTRA_DC) in the extended intra prediction mode are identical to the existing intra planar prediction mode and the intra DC prediction mode (cf. examples, Table 1 and associated description). 32 types of newly added angular modes are applicable in all block sizes and to intra coding of luminance component and chrominance component.

Figure 9:
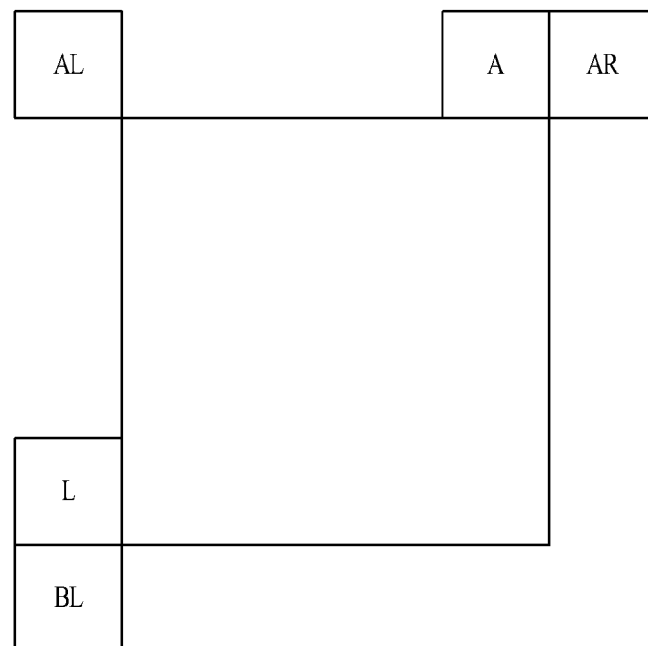
FIG. 9 illustrates MPM candidates for an extended intra prediction mode.

FIG. 9 exemplarily shows MPM candidates for an extended intra prediction mode.

As the number of intra prediction modes increases to 67, the number of Most Probable Modes (MPMs) derived from neighboring blocks for efficient coding of an intra prediction mode may be incremented 6 from 3 and a method of constructing an MPM list may be changed.

A method of constructing an MPM list based on 6 MPM candidates is mainly progressed in order of the 3 types as follows.

Use a neighboring intra prediction mode.
Use a derived intra prediction mode.
Use a default intra prediction mode.

An MPM list including 6 MPM candidates is generated, first of all, using a neighboring intra prediction mode. As exemplarily shown in FIG. 9, an intra prediction mode is added to the 6-MPM candidate list by searching 5 neighboring blocks AL, A, AR, L and BL of a block (i.e., the current block) to perform intra prediction thereon currently. In doing so, the same intra prediction mode is excluded by performing a redundancy check and a new intra prediction mode is added to the 6-MPM candidate list. For example, a search order of neighboring blocks may proceed in order of L→A→intra planar prediction mode→intra DC prediction mode→BL→AR→AL. If the 6-MPM candidate list is completed using the neighboring intra prediction modes, the candidate list generating process is ended.

If the 6-MPM candidate list is not completed using the neighboring intra prediction modes, a candidate list is constructed using a derived intra prediction mode. The derived intra prediction mode is generated by adding −1 or +1 to an intra prediction mode existing in the candidate list already, and the generated derived intra prediction mode is added to the candidate list. In this case, an identical mode is excluded by performing a redundancy check. If there is a new mode, the new mode is added to the candidate list.

If the candidate list is not still completed, a candidate list is constructed using a default intra prediction mode finally. The default intra prediction mode may include one of modes {Vertical, Horizontal, Intra_Angular2, Diagonal}. In an extended intra prediction mode, 'Vertical' may indicate a vertical prediction mode (e.g., Intra_Angular50), 'Horizontal' may indicate an intra horizontal prediction mode (e.g., Intra_Angular18), and 'Diagonal' may indicate a diagonal direction intra prediction mode (e.g., Intra_Angular34 or Intra_Angular66). A redundancy check is performed in order so as to add it to the candidate list.

As described above, an encoder may encode the current block by applying all available intra prediction modes, determine an optimal intra prediction mode based on Rate-Distortion (RD) optimization, and encode the current block based on the determined intra prediction mode. Yet, as the types and number of intra prediction modes increase, an operation amount an encoder side should perform increases, whereby encoding performance may be degraded. For example, in case of applying an intra prediction mode shown in FIG. 5, 35 intra predictions are just performed. Yet, in case of applying the intra prediction mode shown in FIG. 8, an encoder should perform 67 intra predictions. Therefore, the more the intra prediction mode increases, the better the accuracy of intra prediction gets. Yet, as more operations and time may be required for encoding, encoding performance may be lowered.

The present disclosure proposes a method and apparatus for improving encoding performance better than that of the related art and improving coding efficiency by reducing syntax information required for signaling an intra prediction mode. The present disclosure relates to a still or moving image encoding/decoding method, and more particularly, to a method of encoding/decoding a still or moving image based on reducing complexity of intra prediction coding using a simple method in performing the intra prediction coding and apparatus for supporting the same.

Particularly, the present disclosure proposes a method of measuring similarity between neighboring reference samples in performing intra prediction coding [See Method 1 below]. More particularly, the present disclosure proposes a method of measuring similarity between neighboring reference samples using a difference between neighboring samples, a variance, a variation of a predictor (or a predicted block), etc.

In addition, the present disclosure proposes a method of selecting a candidate prediction mode based on similarity between neighboring reference samples in performing intra prediction coding [See Method 2 below]. The present disclosure proposes a method of performing intra prediction coding using a specific mode, which predetermined if similarity between neighboring reference samples is large, as a prediction mode of the current block [See Method 2-1 below]. The present disclosure proposes a method of determining a candidate mode of the current block using an MPM candidate mode if similarity between neighboring reference samples is large [See Method 2-2 below]. And, the present disclosure proposes a method of when similarity in a specific direction between neighboring reference samples is large, determining a mode of the specific direction as a candidate mode of the current block [See Method 2-3 below].

Although methods of the present disclosure are described by focusing on an encoder operation, as the encoder operation corresponds to a decoder operation, the methods of the present disclosure can be performed on a decoder side identically/similarly.

Method 1

Method 1 proposes a method of measuring similarity between neighboring reference samples of a block to process (e.g., encode or decode) currently. In the present specification, the current block refers to a block to process (e.g., encode or decode) currently. As a non-limited example, the current block may correspond to a coding block described above. In the present specification, a neighboring reference sample is a sample of a neighboring block adjacent to the current block and refers to a sample reconstructed before the current block. Particularly, in the present specification, a neighboring reference sample refers to a reconstructed sample of a neighboring block adjacent to the current block in the current picture including the current block. A neighboring block adjacent to the current block used in the present disclosure may include, for example, at least one of a left neighboring block, a lower-left neighboring block, an upper-left neighboring block, an upper neighboring block, and an upper-right neighboring block of the current block.

Figure 10:
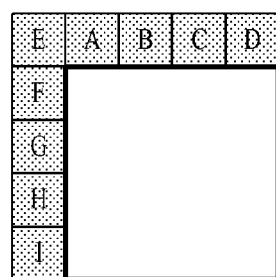
FIG. 10 illustrates neighboring reference samples of the current block used to measure similarity according to the present disclosure.
Figure 10:
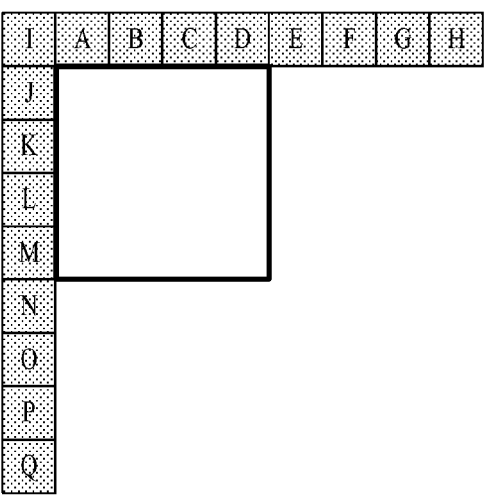

FIG. 10 exemplarily shows neighboring reference samples of the current block used to measure similarity. The example of FIG. 10 is provided to show an example only, by which the present disclosure is non-limited.

FIG. 10 (a) exemplarily shows a method of using a reference sample in size equal to the current block. Referring to FIG. 10 (a), neighboring reference samples of the current block may include reference samples A, B, C and D of an upper neighboring block of the current block, a reference sample of an upper-left neighboring block, and reference samples F, G, H and I of a left neighboring block.

FIG. 10 (b) exemplarily shows a method of using a reference sample in size greater than the current block. Referring to FIG. 10 (b), neighboring reference samples of the current block may include reference samples A, B, C and D of an upper neighboring block of the current block, reference samples E, F, G and H of an upper-right neighbor block of the current block, a reference sample I of an upper-left neighboring block of the current block, reference samples J, K, L and M of a left neighboring block of the current block, and reference samples N, O, P and Q of a lower-left neighboring block of the current block.

If some of reference samples are unavailable, unavailable reference samples may be generated by performing padding based on available samples.

As methods of measuring similarity between reference samples, Method 1 of the present disclosure proposes: 1) a method using a difference between samples (see 'Method 1-1' below); 2) a method using a variance between samples (see 'Method 1-2' below); and 3) a method using variation of predicted blocks generated through a given sample (see 'Method 1-3' below). And, various methods of measuring similarity between reference samples may exist as well as the methods proposed by the present disclosure. The respective methods are described in detail.

Method 1-1: Method Using Difference Between Reference Samples

Method 1-1 of the present disclosure relates to a method of measuring similarity using a difference between neighboring reference samples. Particularly, Method 1-1 relates to a method of using a difference value between a reference sample having a greatest value and a reference sample having a smallest value among neighboring reference samples of the current block. More particularly, in case of Method 1-1, similarity between reference samples may be represented as a difference value between a reference sample having the greatest value and a reference sample having the smallest value among neighboring reference samples of the current block.

For example, in the example of FIG. 10 (a), after respectively selecting a reference sample having a greatest value and a reference sample having a smallest value from reference samples {A, B, C, D, E, F, G, H, I}, a difference value between the selected two reference samples is calculated. For another example, in the example of FIG. 10 (b), after respectively selecting a reference sample having a greatest value and a reference sample having a smallest value from reference samples {A, B, C, D, E, F, G, H, I, J, K, L, M, N, O, P, Q}, a difference value between the selected two reference samples is calculated. Similarity is then measured by comparing the calculated difference value with a predefined threshold value. For example, if the difference value is smaller than the threshold value, similarity may be determined as large. If the difference value is greater than the threshold value, similarity may be determined as small.

Method 1-2: Method Using Variance Between Samples

Method 1-2 of the present disclosure relates to a method of measuring similarity using a variance of a reference sample value. Particularly, in Method 1-2, a variance may be calculated as an average of (each reference sample−average of reference samples). For example, in Method 1-2, a variance may be calculated using Equation 1.

$$S^2 = \frac{1}{N}\sum_{i=1}^{N}(x_i - \bar{x})^2 \quad \text{[Equation 1]}$$

In Equation 1, $S^2$ indicates a variance of a reference sample value, N indicates the number of reference samples, $\bar{x}$ indicates an average of reference samples, and $x_i$ indicates an $i^{th}$ reference sample. For example, in case of 10 (a), N=9 (A-I). In case of FIG. 10 (b), N=17 (A-Q). Similarity is measured by comparing each calculated variance value with a predefined threshold value. For example, if a variance value is smaller than a threshold value, it may be determined that similarity is large. If a variance value is greater than a threshold value, it may be determined that similarity is small.

Figure 11:
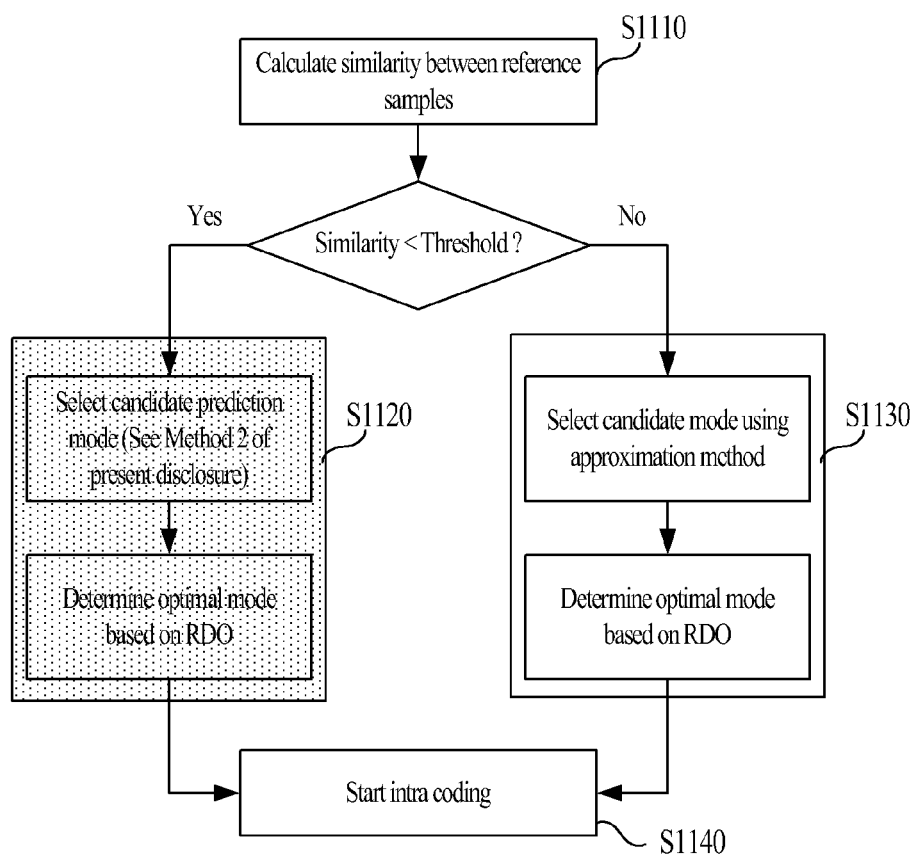
FIGS. 11 to 13 illustrate flowcharts of methods of determining an intra prediction mode according to the present disclosure.

FIG. 11 exemplarily shows a flowchart of a method of determining an intra prediction mode according to the present disclosure. Particularly, FIG. 11 is a flowchart of a method of determining an intra prediction mode based on similarity between reference samples measured by Method 1-1 and Method 1-2 of the present disclosure, respectively.

Referring to FIG. 11, similarity is calculated using a difference between samples by Method 1-1 of the present disclosure or a variance between samples by Method 1-2 of the present disclosure [S1110]. If the similarity calculated in the step S1110 is smaller than a threshold value configured for each method, a candidate prediction mode is selected using Method 2 of the present disclosure. An optimal intra prediction mode is determined based on Rate Distortion Optimization (RDO) in the selected candidate prediction mode [S1120]. And, intra prediction coding is performed based on the determined intra prediction mode [S1140].

If the calculated similarity is greater than the set threshold value, intra prediction coding is performed using the existing intra prediction method [S1130, S1140]. As described above, according to the existing intra prediction method, an optimal intra prediction mode is determined based on Rate Distortion Optimization (RDO) among the intra prediction mode candidates (see FIG. 5 & associated description or FIG. 8 & associated description). Alternatively, after selecting a candidate mode using approximation, an optimal intra prediction mode may be determined based on rate distortion optimization in the selected intra prediction mode.

Method 3-3: Method Using Variation of Predictor Generated Through Given Sample

If values of actually given samples are similar, an actually generated intra predictor (or intra predicted block) becomes very similar no matter which intra prediction mode is used. In this case, the existing video coding system separately transmitting an intra prediction mode is not efficient. To this end, whether to transmit or estimate a real intra prediction mode is determined in a manner as follows.

Intra prediction is performed through all (or predefined representative) intra prediction modes, and variation between predictors generated per mode is used. In this case, although intra predictions can be performed for all modes and compared, since this requires computational complexity in aspect of a decoder, intra prediction may be performed on actually representative modes (e.g., DC, Vertical, and Horizontal) only. Namely, inter-predictor differences for predictors generated using a predetermined representative mode are compared. If the corresponding difference is small (i.e., if al generated predictors are similar), an intra prediction mode for the current block is selected as a specific mode from representative modes, or may be selected by performing rate distortion optimization on the representative modes only.

For example, assuming that Method 1-3 is applied based on representative modes (e.g., DC, Vertical and Horizontal), a difference among a predictor generated based on intra DC prediction mode, a predictor generated based on intra vertical prediction mode, and a predictor generated based on intra horizontal prediction mode is found. If the difference is smaller than a specific threshold, predictors for the representative modes may be determined as similar. If the predictors for the representative modes are determined as similar, a specific intra prediction mode is selected from the representative modes, or an optimal intra prediction mode may be determined by performing rate distortion optimization on the representative modes only. If the predictors for the representative modes are determined as not similar (e.g., if a difference between predictors for representative modes is greater than a specific threshold value), an optimal intra prediction mode may be determined using a conventional method.

Method 1-4: Determination of Threshold Value

In the above-described Methods 1-1 to 1-3, whether to transmit or estimate an intra prediction mode is determined depending on a result of a threshold value, which may be directly connected to the decrement of the number of bits and accuracy of intra prediction. Method 1-4 of the present disclosure proposes a method of determining a threshold value available for Methods 1-1 to 1-3.

In Methods 1-1 to 1-3 of the present disclosure, an intra prediction mode is determined based on the comparison with a threshold value. In Method 2 of the present disclosure, as described below, an amount of syntax information signaled through a bitstream may be changed based on a comparison with a threshold value. For example, as described below, according to Method 2 of the present disclosure, based on the comparison with a threshold value, MPM flag information (e.g., prev_intra_luma_pred_flag) and/or MPM index information (e.g., mpm_idx) and/or intra prediction mode information (e.g., rem_intra_luma_pred_mode) may be omitted from a bitstream. Hence, depending on a result of a threshold value, whether to transmit or estimate an intra prediction mode is determined, which may be directly connected to the decrement of the number of bits or accuracy of intra prediction.

Meanwhile, since it is more sensitive to the number of bits in a low-rate video coding environment having a large quantization parameter rather than a high-rate video coding environment having a small quantization parameter, coding is performed by assigning a weight to the number of bits relatively. Hence, if a quantization parameter has a large value, a threshold value may be determined higher to decrease the number of bits required for signaling of an intra prediction mode rather than accuracy of intra prediction. On the contrary, if a quantization parameter has a small value, as increasing accuracy of intra prediction may be more important than decreasing the number of bits, a threshold value may be set lower. Hence, the threshold value may be determined based on the quantization parameter.

For example, a threshold value of the present disclosure may be determined in proportion to a Quantization Parameter (QP). Particularly, for example, a threshold value of the present disclosure may be determined in a manner of multiplying or dividing a quantization parameter by a specific value. In this case, a threshold value of the present disclosure may be determined based on (QP*A) or (QP/A), where 'A' may be a positive real number predefined between a decoder and an encoder. Or, in order to reduce an amount of an operation, a shift operation is available. A threshold value of the present disclosure may be determined based on (QP<<B) or (QP>>B). Here, '>>' denotes a shift operation and 'B' may include a positive integer predefined between a decoder and an encoder.

Together with or independently from a quantization parameter, a threshold value may be determined in consideration of the number of bits assigned to an intra prediction mode of the current block.

Therefore, an optimal threshold value according to Method 1-3 of the present disclosure is determined in consideration of a quantization parameter and/or the number of bits for an intra prediction mode.

Method 2

Method 2 of the present disclosure proposes a method of selecting a candidate prediction mode based on similarity between neighboring reference samples, which is calculated by Method 1 of the present disclosure. Method 2 is applicable to a case that similarity calculated by Method 1 is large. For example, the large similarity case may include one of the following cases: (1) Difference value between neighboring reference samples<Threshold value; (2) Variance between neighboring reference samples<Threshold value; and (3) Variation value of predictor generated through a given sample<Threshold value. In Method 2 of the present disclosure, 3 kinds of method of selecting a candidate prediction mode are described.

Method 2-1: Method Using Specific Mode as Prediction Mode of Current Block

A method of performing intra prediction coding using a specific intra prediction mode, which is predetermined in case that similarity is large after calculating the similarity by the method mentioned in Method 1 (i.e., Value calculated by a random method mentioned in Method 1<Threshold value), as an intra prediction mode of the current block is described. If similarity between neighboring reference samples is extremely large, i.e., values of all reference samples are equal to each other, although a predictor (or a predicted block) is generated by selecting a random intra prediction mode from the existing intra prediction modes, all the same predictors are generated. This means that an accurate predictor can be generated despite generating a predictor using a limited intra prediction mode in case that similarity between neighboring reference samples is large. Therefore, in case that similarity between neighboring reference samples is large, intra prediction coding is performed using a predetermined representative prediction mode. Here, the number and mode of a representative candidate prediction mode may be randomly determined all.

Figure 12:
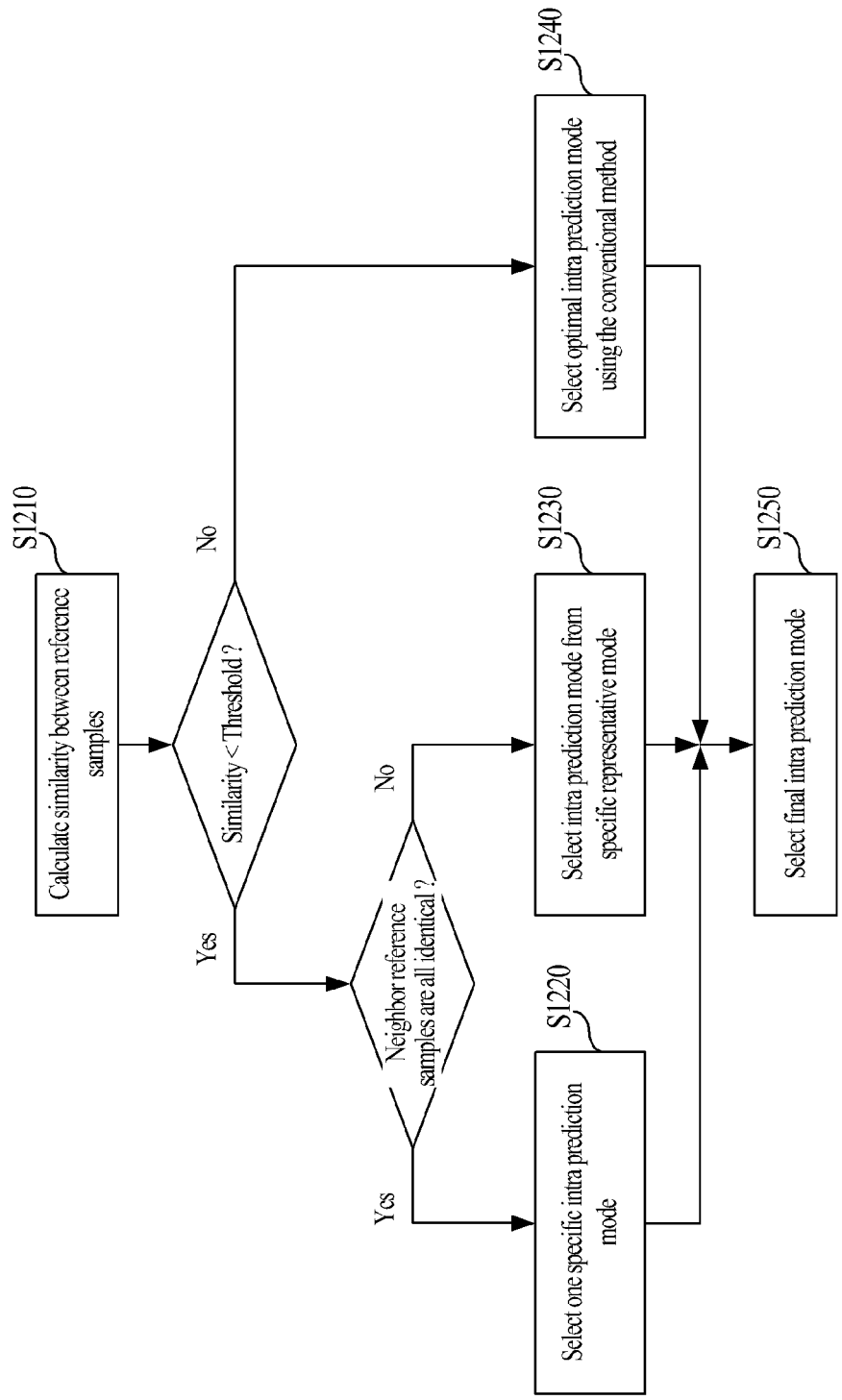

FIG. 12 exemplarily shows a flowchart of a method of determining an intra prediction mode of the current block according to Method 2-1 of the present disclosure.

Referring to FIG. 12, similarity is calculated using a random method among the methods mentioned in Method 1 of the present disclosure [S1210]. If a calculated value of the similarity is greater than a threshold value, an optimal predicted block is selected using the conventional method [S1240]. If the calculated value is smaller than the threshold value, a difference between neighboring reference samples is compared again. If all the neighboring reference sample values are equal to each other, a single specific intra prediction mode is selected as a final intra prediction mode [S1220]. If all the neighboring reference sample values are not equal to each other, a single specific intra prediction mode is selected from specific representative modes by rate distortion optimization [S1230]. For example, the specific representative modes may include an intra DC prediction mode, an intra vertical prediction mode, and an intra horizontal prediction mode, by which the present disclosure is non-limited. Therefore, in Method 201 of the present disclosure, by additionally determining whether the neighboring reference samples are identical together with the similarity of the neighboring reference samples, a final prediction mode is selected [S1250].

Although a single threshold value is used in the example of FIG. 12, the method exemplarily shown in FIG. 12 may be modified into a manner of using a plurality of threshold values. And, the modified method will be referred to as Method 20101 in the present specification.

In Method 2-1-1 of the present disclosure, a multitude of threshold values may be used and applied step by step. For example, if similarity between reference samples is very large (Value indicating similarity<Threshold value 1), a single specific intra prediction mode is used (e.g., see S1220). If similarity between reference samples is large (Threshold value 1<Value indicating similarity<Threshold value 2), an intra prediction mode is selected using M specific representative modes (e.g., see S1230). If similarity between reference samples is small (Threshold value 2<Value indicating similarity<Threshold value 3), an intra prediction mode is selected using N specific representative modes (e.g., see S1230). If similarity between reference samples is very small (Threshold value 3<Value indicating similarity), an intra prediction mode may be selected by the existing method (e.g., see S1240). In this example, it may be set to M<N. An optimal intra prediction mode among M specific representative candidate modes and N specific representative candidate modes may be determined through rate distortion optimization. And, the determined intra prediction mode is coded by an appropriate method.

In Method 2-1-1 of the present disclosure, the number of threshold values is not limited to 3. When Method 2-1-1 is used, each threshold value and the number of threshold values may be selected randomly.

According to Method 2-1 of the present disclosure, although bits for syntax information are generated to encode/decode a determined intra prediction mode, encoding/decoding may be performed using an information size smaller than that of the conventional method. For example, in case of selecting a single specific intra prediction mode according to Method 2-1 of the present disclosure (e.g., see S1220), MPM flag information (e.g., prev_intra_luma_pred_flag) and/or MPM index information (e.g., mpm_idx) and/or intra prediction mode information (e.g., rem_intra_luma_pred_mode) can be omitted from a bitstream and an information size corresponding to the omitted syntax information can be reduced from the bitstream, whereby coding efficiency can be improved. In this example, a single specific intra prediction mode may be determined as an MPM candidate having the lowest index in an MPM candidate list (e.g., see FIG. 6 & associated description or FIG. 8 & associated description), and an encoder and decoder may use the determined single intra prediction mode as an intra prediction mode of the current block. For another example, a single specific intra prediction mode may be determined as an intra prediction mode predefined between the encoder and the decoder.

For another example, in case of selecting an intra prediction mode from specific representative modes according to Method 2-1 of the present disclosure (e.g., see S1230), MPM flag information (e.g., prev_intra_luma_pred_flag) and intra prediction mode information (e.g., rem_intra_luma_pred_mode) may be omitted from a bitstream and MPM index information (e.g., mpm_idx) may be signaled through the bitstream. In this case, as an information size corresponding to the omitted syntax information can be reduced from the bitstream, coding efficiency can be improved. For example, in case of performing the step S1230 according to Method 2-1 of the present disclosure, an encoder may skip encoding the MPM flag information into the bitstream, determine an intra prediction mode selected by performing rate distortion optimization on a specific representative mode as an intra prediction mode of the current block, and encode the MPM index information indicating an intra prediction mode determined among specific representative modes into the bitstream. Similarly, in case of performing the step S1230 according to Method 2-1 of the present disclosure, the decoder may parse the MPM index information from the bitstream without parsing the MPM flag information from the bitstream and determine the intra prediction mode indicated by the MPM index information as the intra prediction mode of the current block.

Method 2-2: Method Using MPM Candidate Mode as Candidate Mode of Current Block

In Method 2-2 of the present disclosure, similarity is calculated by the method mentioned in Method 1 of the present disclosure. If the similarity is large (e.g., Value calculated by the random method mentioned in Method 1<Threshold value), a method of determining a candidate mode of the current block using an MPM candidate mode is described. Method 2-2 relates to a method of if similarity between reference samples is large, using some or all of MPM candidate modes as a prediction candidate mode of the current block. In Method 2-2, an information size to be transmitted is determined depending on how many modes among MPM candidate modes will be used as prediction candidate modes for the current mode.

For example, if a mode (e.g., mode of MPM[0]) having a lowest index among modes of an MPM candidate list (e.g., see FIG. 6 & associated description or FIG. 8 & associated description) is used only as a candidate mode, bits for transmitting and intra prediction mode are unnecessary. Hence, such syntax information for an intra prediction mode as MPM flag information (e.g., prev_intra_luma_pred_flag), MPM index information (e.g., mpm_idx) and intra prediction mode information (e.g., rem_intra_luma_pred_mode) is not signaled through a bitstream. As similarity between reference samples is large, the proposed Method 202 is applied, a predictor may be generated with a mode (e.g., mode of MPM[0]) having a lowest index among modes of the MPM candidate list.

For another example, in case of using two or more modes among modes of an MPM candidate list are used as candidate modes, an optimal mode may be determined firstly for the used candidate modes through rate distortion optimization and information indicating the determined optimal mode may be signaled through a bitstream. In this case, syntax information such as MPM flag information (e.g., prev_intra_luma_pred_flag) and intra prediction mode information (e.g., rem_intra_luma_pred_mode) is not signaled through the bitstream but MPM index information (e.g., mpm_idx) indicating the optimal mode may be signaled through the bitstream. For example, if two modes (e.g., MPM[0] and MPM[1]) having the lowest index in the MPM candidate list are used as candidate modes, an optimal mode is determined firstly through rate distortion optimization and one bit is needed to determine a mode selected from the two modes. Thus, a random mode is selected from modes of an MPM candidate list and then used as a candidate mode of the current block, whereby a predicted block may be generated.

In Method 2-2 of the present disclosure, the number of candidate modes used to select a final prediction mode from an MPM candidate list may be randomly determined. The number of candidate modes used in Method 2-2 is signaled through a bitstream or may include a value predefined between an encoder and a decoder.

In case of applying Method 2-2 of the present disclosure, the number of bits required for signaling of syntax information may be decreased in comparison to the conventional method. For example, it is able to decrease the number of bits required for such syntax information for an intra prediction mode as MPM flag information (e.g., prev_intra_luma_pred_flag), MPM index information (e.g., mpm_idx) and intra prediction mode information (e.g., rem_intra_luma_pred_mode). Moreover, depending on the number of actually used candidate modes in the MPM candidate list, the number of bits required for index information indicating the actually used candidate mode can be decreased. For example, if the MPM candidate list contains 3 MPM candidate modes, 2 bits are required for signaling of MPM index information. Yet, in case of using 2 candidate modes in Method 2-2 of the present disclosure, 1 bit is required for signaling of a selected candidate mode, whereby coding efficiency can be improved. In addition, in case of applying Method 202 of the present disclosure, it is necessary to perform rate distortion optimization on some intra prediction modes only, whereby encoding performance can be improved rapidly.

Figure 13:
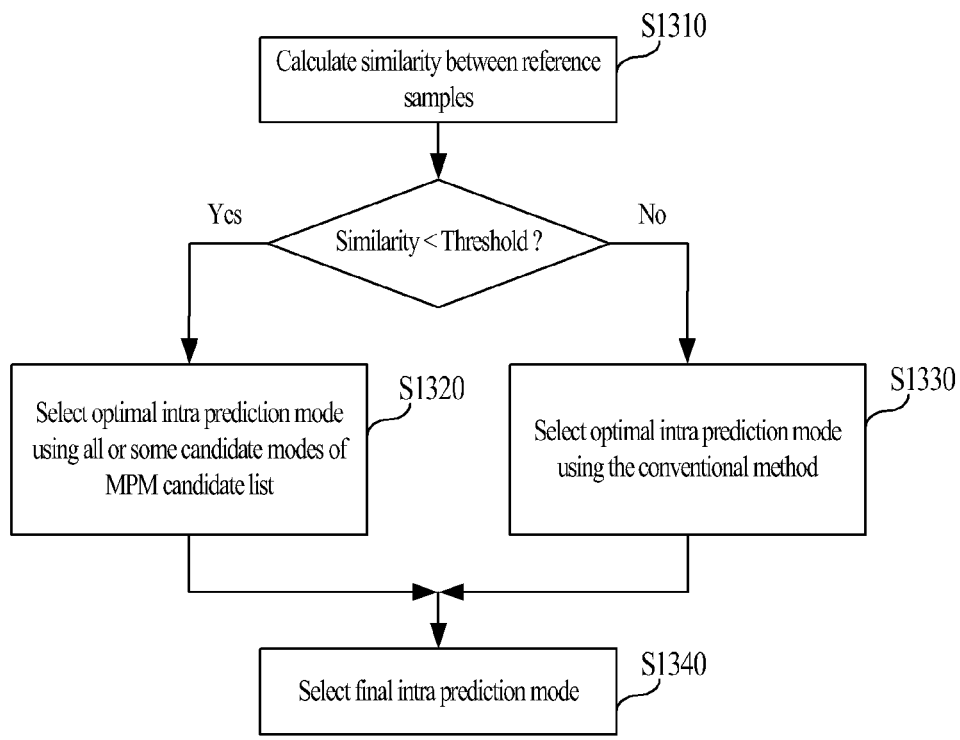

FIG. 13 exemplarily shows a flowchart of Method 2-2 of the present disclosure. Although the description with reference to FIG. 13 is made by focusing on an encoder operation, the method shown in FIG. 13 may be performed in a decoder identically/similarly.

In a step S1310, a value indicating similarity between reference samples (e.g., see FIG. 10 & associated description) used for an intra prediction of the current block can be obtained. For example, the value indicating the similarity between the reference samples may be obtained by the method described in Method 1 of the present disclosure.

Based on the value obtained in the step S1310 and a specific threshold value, an intra prediction mode of the current block may be determined (see S1320 or S1330). For example, the specific threshold value may be determined by Method 1-4 of the present disclosure.

If the similarity indicating value obtained in the step S1310 is smaller than the specific threshold value, an encoder may construct a candidate mode list including some or all of an MPM candidate list, select an optimal mode through rate distortion optimization for the constructed candidate mode list [S1320], and then determine the selected intra prediction mode as an intra prediction mode of the current block [S1340].

As described above, in case of using a single candidate mode (e.g., a mode having a lowest index) in the MPM candidate list in the step S1320, the single candidate mode is determined as the intra prediction mode of the current block, syntax information such as MPM flag information (e.g., prev_intra_luma_pred_flag), MPM index information (e.g., mpm_idx) and intra prediction mode information (e.g., rem_intra_luma_pred_mode) is not encoded into a bitstream, and it is unnecessary to construct a candidate mode list. Thus, in case of using a single candidate mode only in the MPM candidate list, a decoder side does not parse the syntax information such as MPM flag information (e.g., prev_intra_luma_pred_flag), MPM index information (e.g., mpm_idx) and intra prediction mode information (e.g., rem_intra_luma_pred_mode) from a bitstream but may determine the single candidate mode (e.g., a mode having a lowest index) as an intra prediction mode of the current block.

In case that a plurality of candidate modes in the MPM candidate list are used in the step S1320, the encoder may construct a candidate mode list including a plurality of the used candidate modes, select an optimal mode by performing rate distortion optimization on the used candidate modes, and encode index information indicating an intra prediction mode selected from the constructed candidate mode list into a bitstream. In this case, such syntax information as MPM flag information (e.g., prev_intra_luma_pred_flag) and intra prediction mode information (e.g., rem_intra_luma_pred_mode) is not encoded into the bitstream. The decoder side may construct a candidate mode list including a plurality of candidate modes used in the MPM candidate list in the same manner as the encoder and determine a candidate mode indicated by the parsed index information in the constructed candidate mode list as an intra prediction mode of the current block. The decoder may skip an operation of parsing the MPM flag information (e.g., prev_intra_luma_pred_flag) from the bitstream.

As described above, the number of the candidate modes used for Method 2-2 in the MPM candidate list may be signaled through a bitstream or predefined between the encoder and the decoder.

If the similarity indicating value obtained in the step S1310 is greater than the specific threshold value, an optimal intra prediction mode may be selected using the conventional method [S1330]. For example, an optimal intra prediction mode may be selected by performing rate distortion optimization on the intra prediction mode described with reference to FIG. 5 or FIG. 8. Alternatively, after a candidate mode has been selected using approximation, an optimal intra prediction mode may be selected from the selected intra prediction modes based on rate distortion optimization (e.g., see S1130). The encoder may determine MPM flag information (e.g., prev_intra_luma_pred_flag), MPM index information (e.g., mpm_idx) and intra prediction mode information (e.g., rem_intra_luma_pred_mode) according to the method described with reference to FIG. 6 and FIG. 7 based on the selected optimal intra prediction mode and then encode them into a bitstream.

If the similarity indicating value obtained in the step S1310 is greater than the specific threshold value, the decoder obtains the MPM flag information (e.g., prev_intra_luma_pred_flag) from the bitstream. If the obtained MPM flag information indicates that the intra prediction mode of the current block is derived from a neighboring block of the current block, the decoder may obtain the MPM index information (e.g., mpm_idx) and then determine a mode indicated by the MPM index information in the MPM candidate list as an intra prediction mode of the current block. If the obtained MPM flag information indicates that the intra prediction mode of the current block is not derived from the neighboring block of the current block, the decoder may obtain the intra prediction mode information (e.g., rem_intra_luma_pred_mode) from the bitstream and then determine an intra prediction mode of the current block based on the obtained information.

If the optimal intra prediction mode is selected in the step S1320 or S1330, the current block may be encoded based on the selected intra prediction mode. As described in the step S1320 or S1330, the decoder side may reconstruct the current block based on the determined intra prediction mode.

Method 2-3: Method Using Mode of Specific Direction as Candidate Mode of Current Block When similarity in a specific direction between neighboring reference samples is large, a method of determining a mode of the specific direction as a candidate mode of the current block is described. Although Method 2-3 of the present disclosure is described by referring to the example of FIG. 14 for clarity of description, the present disclosure is non-limited by the example of FIG. 14 and is applicable to other cases identically/similarly.

Figure 14:
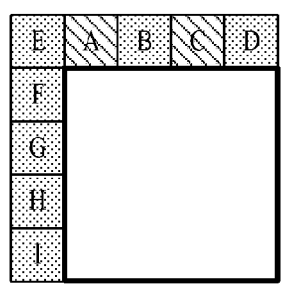
FIG. 14 illustrates a case that similarity of reference samples in each direction is different.

FIG. 14 exemplarily shows a case that similarity of a reference sample in each direction is different. Although it is assumed that a neighboring reference sample in the same size as the current block is used in the example of FIG. 14 for clarity of description, as described with reference to FIG. 10, various neighboring reference samples are available. In addition, FIG. 14 assumes that similarity is small in case of upper reference samples A, B, C and D or large in case of left reference samples F, G, H and I.

Referring to FIG. 14, after a difference or variation between reference samples has been calculated based on Method 1 of the present disclosure, similarity is measured. If the similarity is large (e.g., Value calculated based on Method 1 of the present disclosure<Threshold value), similarity of a left reference sample and similarity of an upper reference sample are calculated again, respectively. By comparing the calculated reference samples in the respective directions, a side having a greater similarity is determined. In the example of FIG. 14, the similarity of the upper reference sample and the similarity of the left reference sample are compared. Yet, the comparative region of similarity may be further subdivided. For example, the comparative region may be divided into 4 parts including upper-right, upper, left and lower-left or 6 parts including upper-right, upper, upper-left, upper-left, left and lower-left. These are examples only, and subdivision may be further performed in various ways.

The case of FIG. 14 is described as an example. Similarity between reference samples is calculated using Method 1 of the present disclosure. If the calculated value is smaller than a predetermined threshold value, similarity of a left reference sample and similarity of an upper reference sample are calculated again, respectively. As shown in FIG. 14, if the similarity of the left reference sample is large, although a random mode is selected from horizontal modes for generating a predictor (or a predicted block) using the left reference sample, an almost similar predicted block can be generated. On the other hand, if a random mode is selected from vertical modes for generating a predictor using the upper reference sample, a different predicted block is generated according to angularity of the selected mode. Therefore, in the example of FIG. 14, it is efficient that the number of the horizontal modes having large similarity is decreased.

For example, if the similarity of the left reference sample is very large, prediction for a horizontal direction is performed using one representative mode among horizontal modes that are the modes of the corresponding direction. If the similarity of the left reference sample is large, prediction for a horizontal direction is performed using specific representative modes among horizontal modes that are the modes of the corresponding direction. The number of candidate representative modes can be determined in the same manner by comparing the similarity of the upper reference sample. In order to determine an optimal prediction mode using such a method, complexity can be reduced by decreasing the number of modes to calculate through rate distortion optimization. In addition, by efficiently decreasing the number of redundant modes from the perspective of the rate distortion optimization, a size of information to transmit can be reduced.

Figure 15:
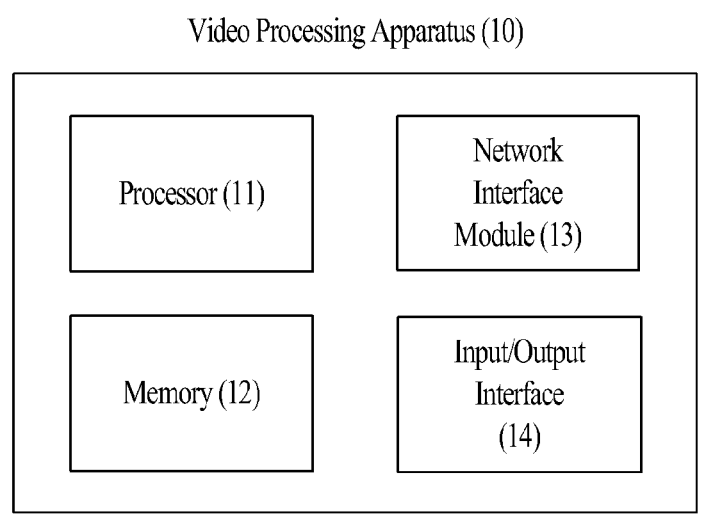
FIG. 15 illustrates a video processing apparatus to which the present disclosure can be applied.

FIG. 15 illustrates a block diagram to which the present invention can be applied. The video processing apparatus may include an encoding apparatus and/or a decoding apparatus of a video signal. For example, the video processing apparatus to which the present invention can be applied may include a mobile terminal such as a smart phone, a mobile equipment such as a laptop computer, a consumer electronics such as a digital TV, a digital video player, and etc.

A memory 12 may store program for processing and controlling by a processor 11, and may store a coded bitstream, a reconstructed image, control information, and the like. Further, the memory 12 may be used as a buffer for various video signals. The memory 12 may be implemented as a storage device such as a ROM (Read Only Memory), RAM (Random Access Memory), EPROM (Erasable Programmable Read Only Memory), EEPROM (Electrically Erasable Programmable Read-Only Memory), a flash memory, SRAM (Static RAM), HDD (Hard Disk Drive), SSD (Solid State Drive), and etc.

The processor 11 controls operations of each module in the video processing apparatus. The processor 11 may perform various control functions to perform encoding/decoding according to the present invention. The processor 11 may be referred to as a controller, a microcontroller, a microprocessor, a microcomputer, or etc. The processor 11 may be implemented as a hardware or a firmware, a software, or a combination thereof. When the present invention is implemented using a hardware, the processor 11 may comprise ASIC (application specific integrated circuit), DSP (digital signal processor), DSPD (digital signal processing device), PLD (programmable logic device), FPGA (field programmable gate array), or the like. Meanwhile, when the present invention is implemented using a firmware or a software, the firmware or software may comprise modules, procedures, or functions that perform functions or operations according to the present invention. The firmware or software configured to perform the present invention may be implemented in the processor 11 or may be stored in the memory 12 and executed by the processor 11.

In addition, the apparatus 10 may optionally include a network interface module (NIM) 13. The network interface module 13 may be operatively connected with the processor 11, and the processor 11 may control the network interface module 13 to transmit or receive wireless/wired signals carrying information, data, a signal, and/or a message through a wireless/wired network. For example, the network interface module 13 may support various communication standards such as IEEE 802 series, 3GPP LTE(-A), Wi-Fi, ATSC (Advanced Television System Committee), DVB (Digital Video Broadcasting), and etc, and may transmit and receive a video signal such as a coded bitstream and/or control information according to the corresponding communication standard. The network interface module 13 may not be included as necessary.

In addition, the apparatus 10 may optionally include an input/output interface 14. The input/output interface 14 may be operatively connected with the processor 11, and the processor 11 may control the input/output interface 14 to input or output a control signal and/or a data signal. For example, the input/output interface 14 may support specifications such as USB (Universal Serial Bus), Bluetooth, NFC (Near Field Communication), serial/parallel interface, DVI (Digital Visual Interface), HDMI (High Definition Multimedia Interface) so as to be connected with input devices such as a keyboard, a mouse, a touchpad, a camera and output devices such as a display.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention can be applied to a video processing apparatus such as a decoding apparatus or an encoding apparatus.

What is claimed is:

1. A method of decoding a bitstream for a video signal by a decoding apparatus, the method comprising:
obtaining a value representing similarity between reference samples for an intra prediction of a current block, wherein the value representing the similarity is obtained based on a difference value for the reference samples or a variance of the reference samples;
determining an intra prediction mode of the current block based on the obtained value and a specific threshold value; and
reconstructing the current block based on the determined intra prediction mode,
wherein determining the intra prediction mode of the current block comprises:
obtaining index information from the bitstream when the value representing the similarity is smaller than the specific threshold value, wherein obtaining flag information indicating whether the intra prediction mode of the current block is derived from a neighboring block of the current block is skipped;
constructing a candidate mode list based on an intra prediction mode of the neighboring block of the current block; and
determining a candidate mode indicated by the index information among the constructed candidate mode list as the intra prediction mode of the current block,
wherein the specific threshold value is determined based on a quantization parameter of the current block.

2. The method of claim 1, wherein the difference value represents a difference between a greatest value and a smallest value among the reference samples for the intra prediction of the current block.

3. The method of claim 1, wherein the reference samples for the intra prediction of the current block comprise a reference sample of an upper neighboring block adjacent to the current block, a reference sample of an upper-right neighboring block adjacent to the current block, a reference sample of an upper-left neighboring block adjacent to the current block, a reference sample of a left neighboring block adjacent to the current block, and a reference sample of a lower-left neighboring block adjacent to the current block.

4. The method of claim 1, wherein determining the intra prediction mode of the current block further comprises:
obtaining the flag information from the bitstream when the value representing the similarity is greater than the specific threshold value; and
obtaining the index information from the bitstream when the flag information indicates that the intra prediction mode of the current block is derived from the neighboring block of the current block.

5. The method of claim 4, wherein determining the intra prediction mode of the current block further comprises:
obtaining intra prediction mode information for the current block from the bitstream when the flag information indicates that the intra prediction mode of the current block is not derived from the neighboring block of the current block.

6. An apparatus for decoding a bitstream for a video signal, the apparatus comprising:
  a memory; and
  a processor operatively connected to the memory,
  wherein the processor is configured to:
    obtain a value representing similarity between reference samples for an intra prediction of a current block,
    wherein the value representing the similarity is obtained based on a difference value for the reference samples or a variance of the reference samples;
    determine an intra prediction mode of the current block based on the obtained value and a specific threshold value; and
    reconstruct the current block based on the determined intra prediction mode,
    wherein determining the intra prediction mode of the current block comprises:
    obtaining index information from the bitstream when the value representing the similarity is smaller than the specific threshold value, wherein obtaining flag information indicating whether the intra prediction mode of the current block is derived from a neighboring block of the current block is skipped;
    constructing a candidate mode list based on an intra prediction mode of the neighboring block of the current block; and
    determining a candidate mode indicated by the index information among the constructed candidate mode list as the intra prediction mode of the current block,
    wherein the specific threshold value is determined based on a quantization parameter of the current block.

7. The apparatus of claim 6, wherein the difference value represents a difference between a greatest value and a smallest value among the reference samples for the intra prediction of the current block.

8. The apparatus of claim 6, wherein the reference samples for the intra prediction of the current block comprise a reference sample of an upper neighboring block adjacent to the current block, a reference sample of an upper-right neighboring block adjacent to the current block, a reference sample of an upper-left neighboring block adjacent to the current block, a reference sample of a left neighboring block adjacent to the current block, and a reference sample of a lower-left neighboring block adjacent to the current block.

9. The apparatus of claim 6, wherein determining the intra prediction mode of the current block further comprises:
  obtaining the flag information from the bitstream when the value representing the similarity is greater than the specific threshold value; and
  obtaining the index information from the bitstream when the flag information indicates that the intra prediction mode of the current block is derived from the neighboring block of the current block.

10. The apparatus of claim 9, wherein determining the intra prediction mode of the current block further comprises:
  obtaining intra prediction mode information for the current block from the bitstream when the flag information indicates that the intra prediction mode of the current block is not derived from the neighboring block of the current block.

\* \* \* \* \*